US012591338B1

(12) United States Patent
Chen et al.

(10) Patent No.: US 12,591,338 B1
(45) Date of Patent: Mar. 31, 2026

(54) TOUCH CONTROL METHOD WITH NORMALIZATION CALCULATION

(71) Applicant: Novatek Microelectronics Corp., Hsinchu (TW)

(72) Inventors: Jou-Chia Chen, Yunlin County (TW); Chung-Cher Lin, Hsinchu County (TW); Hsin-Ting Chan, Taichung City (TW); Ding-Teng Shih, Hsinchu City (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/961,410

(22) Filed: Nov. 26, 2024

(51) Int. Cl.
*G06F 3/041* (2006.01)

(52) U.S. Cl.
CPC .................................. *G06F 3/04186* (2019.05)

(58) Field of Classification Search
CPC .................................................... G06F 3/04186
See application file for complete search history.

(56) References Cited

U.S. PATENT DOCUMENTS

| 9,285,880 | B2 | 3/2016 | Araki |
| 9,569,046 | B2 | 2/2017 | Kim et al. |

| 11,989,369 | B1 * | 5/2024 | Ben-Amram | ....... G06F 3/03545 |
| 2014/0176455 | A1 | 6/2014 | Araki | |
| 2015/0103035 | A1 | 4/2015 | Kim et al. | |
| 2017/0115817 | A1 | 4/2017 | Kim et al. | |
| 2019/0294258 | A1 * | 9/2019 | Forlines | ................ G06F 3/0202 |
| 2023/0326255 | A1 * | 10/2023 | Takahata | ............ G06V 40/1347 |

FOREIGN PATENT DOCUMENTS

| CN | 107272972 | 10/2017 |
| CN | 104285205 | 2/2018 |
| CN | 113220160 | 8/2021 |
| CN | 116661625 | 8/2023 |

OTHER PUBLICATIONS

"Office Action of Taiwan Counterpart Application", issued on Jan. 13, 2026, p. 1-p. 4.

* cited by examiner

*Primary Examiner* — Afroza Chowdhury

(74) *Attorney, Agent, or Firm* — JCIPRNET

(57) ABSTRACT

A touch control method configured to control a touch sensing operation of a touch apparatus is provided. The touch apparatus has a plurality of sensors. The touch control method includes: obtaining a first sensing value of a touched sensor and a plurality of sensing values of sensors neighbored with the touched sensor; determining a touch position of the touch object inside the touched sensor according to the first sensing value; normalizing the first sensing value to a second sensing value according to the touch position inside the touched sensor; and performing a touch reporting process according to the second sensing value.

9 Claims, 13 Drawing Sheets

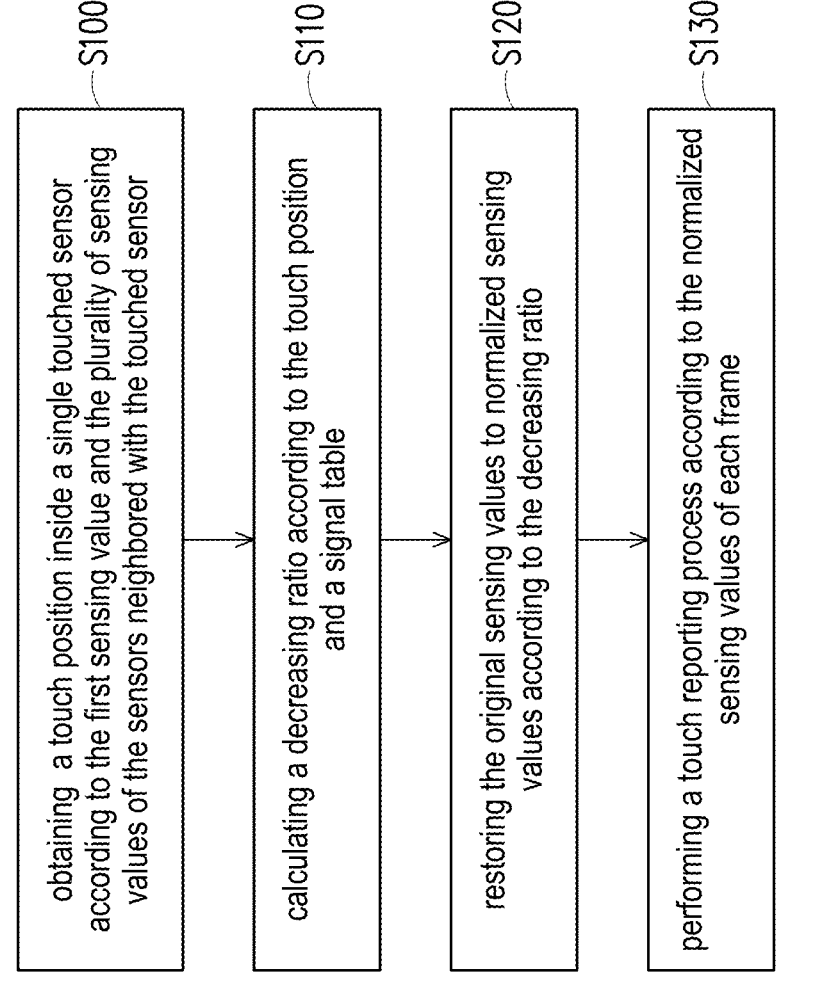

obtaining a touch position inside a single touched sensor according to the first sensing value and the plurality of sensing values of the sensors neighbored with the touched sensor ⟶ S100 calculating a decreasing ratio according to the touch position and a signal table ⟶ S110 restoring the original sensing values to normalized sensing values according to the decreasing ratio ⟶ S120 performing a touch reporting process according to the normalized sensing values of each frame ⟶ S130

FIG. 5

⊗ : sensor center
◉ : sensor edge

TOUCH CONTROL METHOD WITH NORMALIZATION CALCULATION

BACKGROUND

Technical Field

The invention relates to a touch control method, and in particular, to a touch control method with normalization calculation.

Description of Related Art

There will be a difference in sensing values between touching on the center and edge of the touch sensor. The reporting threshold must be set at a lower limit to ensure that no matter which point on the touch panel is touched, it will pass the reporting threshold without being affected by the noise. The current touch algorithm, in determining the effective touch, only considers the original sensing value to determine if it is above the reporting threshold.

However, if the reporting threshold remains unchanged, the sensing value of touching on the edge will be delayed to report by a few frames before it reaches the reporting threshold. In addition, if the user slides on the touch panel with gloves on, the sensing value of touching on the edge tends to be small, close to the noise, and is therefore suppressed. In the related art, the problem of low sensing values at the edges has often resulted in delayed or failed operation, especially when using gloves or other less conductive materials.

SUMMARY

The invention is directed to a touch control method, capable of enhancing the sensitivity and accuracy of the touch panel and improving the user experience.

An embodiment of the invention provides a touch control method, configured to control a touch sensing operation of a touch apparatus. The touch apparatus has a plurality of sensors. The touch control method includes: obtaining a first sensing value of a touched sensor and a plurality of sensing values of sensors neighbored with the touched sensor; determining a touch position of the touch object inside the touched sensor according to the first sensing value and the plurality of sensing values of the sensors neighbored with the touched sensor; normalizing the first sensing value to a second sensing value according to the touch position inside the touched sensor; and performing a touch reporting process according to the second sensing value.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 5 is a flowchart illustrating a touch control method with normalization calculation according to an embodiment of the invention.

DESCRIPTION OF THE EMBODIMENTS

Figure 1:
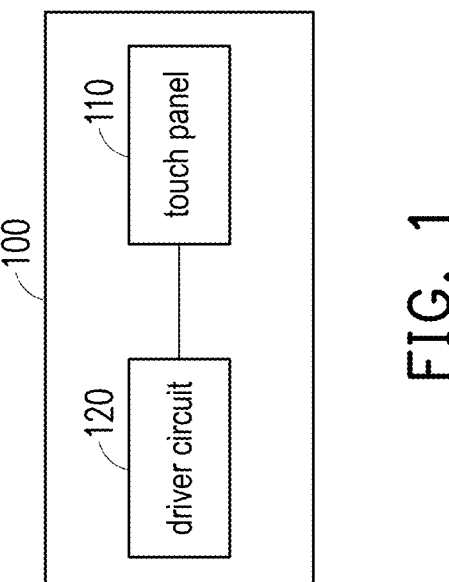
FIG. 1 is a block diagram illustrating a touch apparatus according to an embodiment of the invention.

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". The terms "first" and "second" mentioned in the full text of the specification of the disclosure (including claims) are used to name elements or to distinguish different embodiments or scopes, neither to be used to limit upper or lower limit of the number of elements nor limit the sequence of the elements. In addition, wherever possible, elements/components/steps with the same reference numbers are used in the drawings and embodiments to represent the same or similar parts. Elements/components/steps using the same numbers or using the same terms in different embodiments may serve as cross-reference for each other.

FIG. 1 is a block diagram illustrating a touch apparatus according to an embodiment of the invention. Referring to FIG. 1, the touch apparatus 100 includes a touch panel 110 and a driver circuit 120. The driver circuit 120 is configured to drive the touch panel 110 to perform a touch sensing operation. The touch apparatus 100 can detect a touch event, and enter a touch point reporting process early when a human finger or a touch object hovers on or approaches the touch panel 110.

With respect to hardware structures, sufficient teaching, suggestion and implementation illustration for the touch panel 110 and the driver circuit 120 can be obtained by reference to the common knowledge of the related art.

Figure 2:
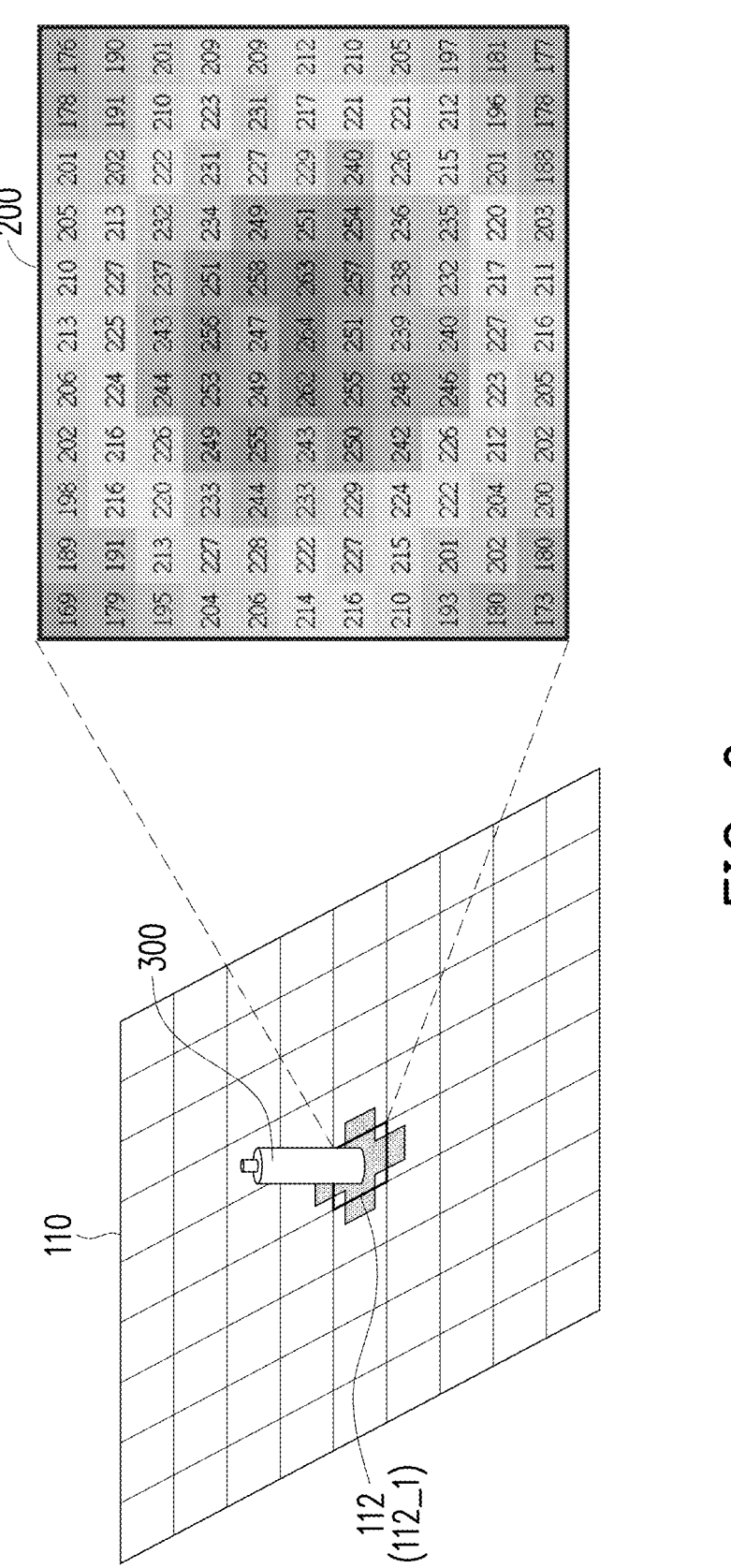
FIG. 2 is a schematic diagram illustrating the touch panel of FIG. 1 according to an embodiment of the invention.

FIG. 2 is a schematic diagram illustrating the touch panel of FIG. 1 according to an embodiment of the invention. Referring to FIG. 1 and FIG. 2, the touch panel 110 includes a plurality of sensors 112. One signal table can be established for a specified sensor. For example, in FIG. 2, the signal table 200 is established for the sensor 112_1, and records a plurality of signal values of the sensor 112_1. The sensor 112_1 locates in a touch position (10, 18) of the touch panel 110, wherein the X-coordinate value X1 is 10, and the Y-coordinate value Y1 is 18. In the present embodiment, the driver circuit 120 can calculate a normalized sensing value of the sensor 112_1 using the signal table 200.

In the present embodiment, if the touch panel 110 is flat, the driver circuit 120 can establish a single signal table for all sensors 112. In an embodiment, the driver circuit 120 can also establish respective signal tables for the sensors 112 of the touch panel 110. This is more accurate when the driver circuit 120 calculates normalized sensing values.

The following section will describe the method for establishing the signal table 200. In the present embodiment, a copper cylinder (test device) 300 is connected to a robotic arm, which is not shown for the sake of simplicity. The center of the touch panel 110 or a specified sensor is selected as the point of contact. The copper cylinder 300 is then clicked on the selected sensor, and the signal value is recorded in the signal table 200, which may be an 11×11 signal table. The signal values are obtained when the copper cylinder 300 is pressed on the 11×11 locations divided in a single sensor 112. It should be noted that the size of the signal table 200 is not intended to limit the invention. In addition, the signal values recorded in the signal table 200 have arbitrary unit (A.U.), and are not intended to limit the invention.

The signal table 200 shows a non-linear decreasing relationship of signal values from center to edge. From the signal table 200, it is possible to deduce the decreasing ratio of edge and center signals. Therefore, the driver circuit 120 can normalize the sensing value of the sensor 112_1 using the signal table 200.

Figures 3A, 3B, 3C:
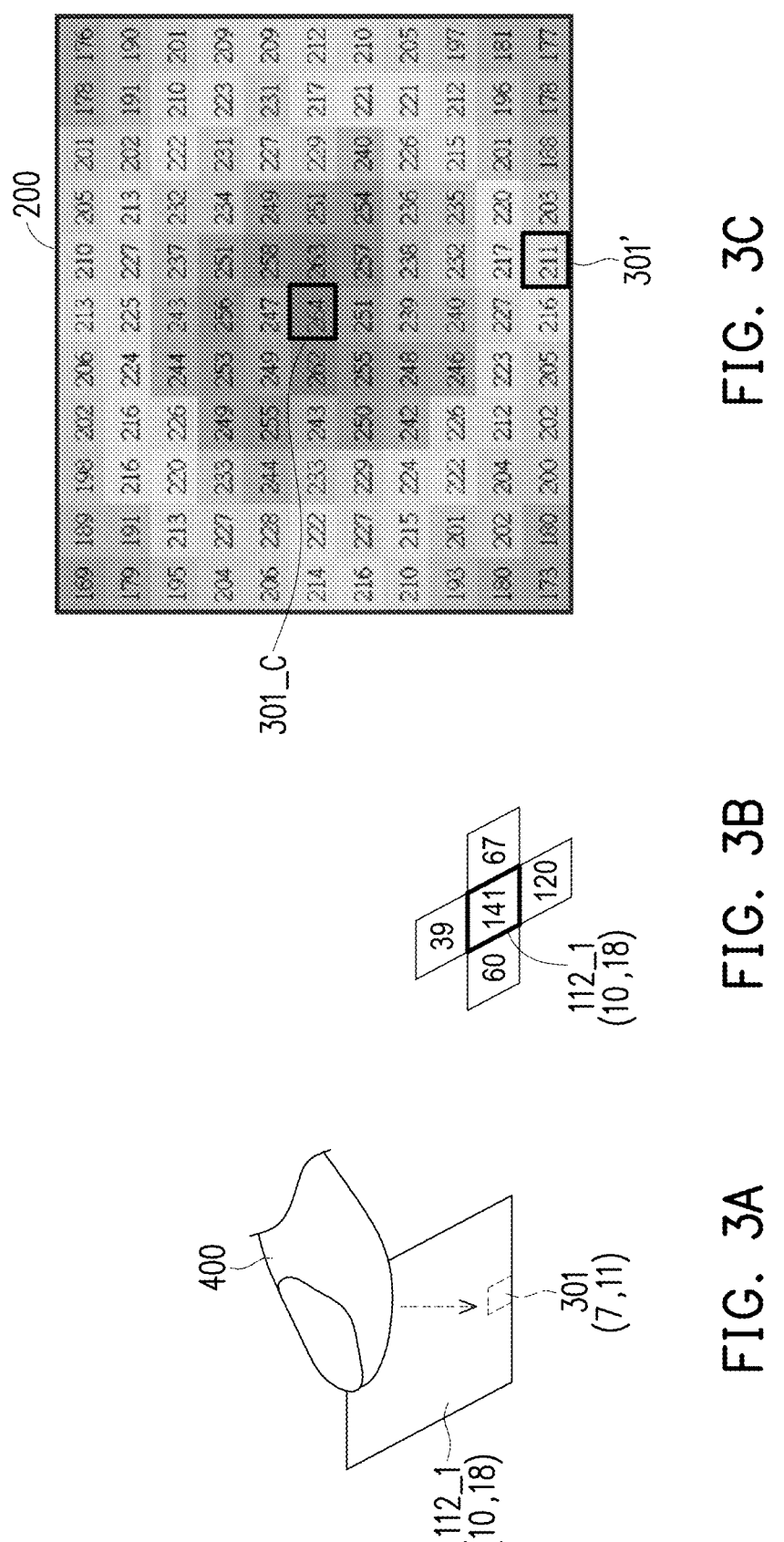
FIG. 3A is a schematic diagram illustrating a finger hovering on the edge of the sensor according to an embodiment of the invention.
FIG. 3B illustrates sensing values that the finger hovers on the edge of the sensor according to an embodiment of the invention.
FIG. 3C illustrates signal values recorded in the signal table according to an embodiment of the invention.

To be specific, FIG. 3A is a schematic diagram illustrating a finger hovering on the edge of the sensor according to an embodiment of the invention. FIG. 3B illustrates sensing values that the finger hovers on the edge of the sensor according to an embodiment of the invention. FIG. 3C illustrates signal values recorded in the signal table according to an embodiment of the invention.

In FIG. 3A, the finger (touch object) 400 hovers on a block 301 at the edge of the touched sensor 112_1. The block 301 locates in a touch position (7, 11) inside the touched sensor 112_1, wherein the X-coordinate value X2 is 7, and the Y-coordinate value Y2 is 11. The touch position (7, 11) at the edge of the sensor 112_1 is determined by the maximum and second largest sensing values of the sensors. The sensing values of the sensor 112_1 and neighboring sensors before normalization are shown in FIG. 3B. The maximum and second largest sensing values of the sensors are 141 and 120, wherein the maximum sensing value (first sensing value) 141 is sensed by the touched sensor 112_1, and the second largest sensing value 120 is selected from the plurality of sensing values of sensors neighbored with the touched sensor 112_1. The touch position is determined as a down edge of the sensor 112_1, which the coordinate is (7, 11).

Figure 3D:
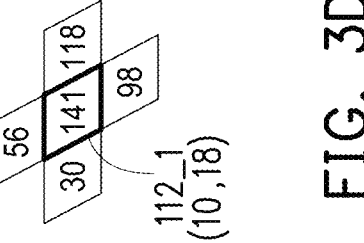
FIG. 3D illustrates sensing values that the finger hovers on the edge of the sensor according to another embodiment of the invention.

In another embodiment, as shown in FIG. 3D, the maximum and second largest sensing values of the sensors are 141 and 118. The touch position may be determined as a right edge of the sensor 112_1.

In FIG. 3B, when the finger 400 is hovering on the edge of the sensor 112_1, the sensing value is sensed to be 141. In FIG. 3A and FIG. 3C, from the touch position (7, 11), the block 301 corresponds to the edge block 301' of the signal table 200, and the signal value recorded in the edge block 301' is 211. That is, the first signal value 211 corresponds to the touch position inside the touched sensor 112_1. On the other hand, the signal value recorded in the center block 301_C of the signal table 200 is 264. The second signal value 264 corresponds to a center position of the sensor 112_1. Therefore, the decreasing ratio is 211/264=0.799. The driver circuit 120 can calculate a normalized sensing value (second sensing value) as 141/0.799=176.47 for the touch point reporting process. The original sensing value 141 is normalized to a larger value 176.47.

The above-mentioned values are not intended to limit the invention. In an embodiment, the sensing value of the same sensor can be collected several times to find out the error range, which can be used as a basis for setting the reporting threshold.

The block 301 at the edge of the sensor 112_1 in FIG. 3A is taken as an example. The same process can be used for other blocks at the edge of the sensor 112_1 or blocks at edges of other sensors.

Figure 4A:
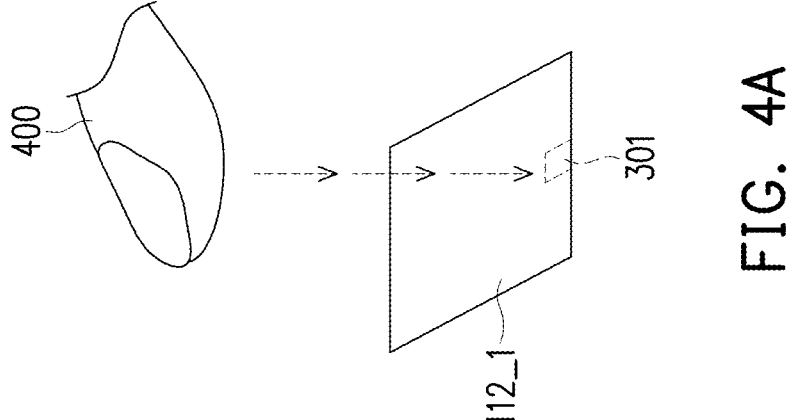
FIG. 4A shows a finger approaching the edge of the sensor according to an embodiment of the invention.
Figure 4B:
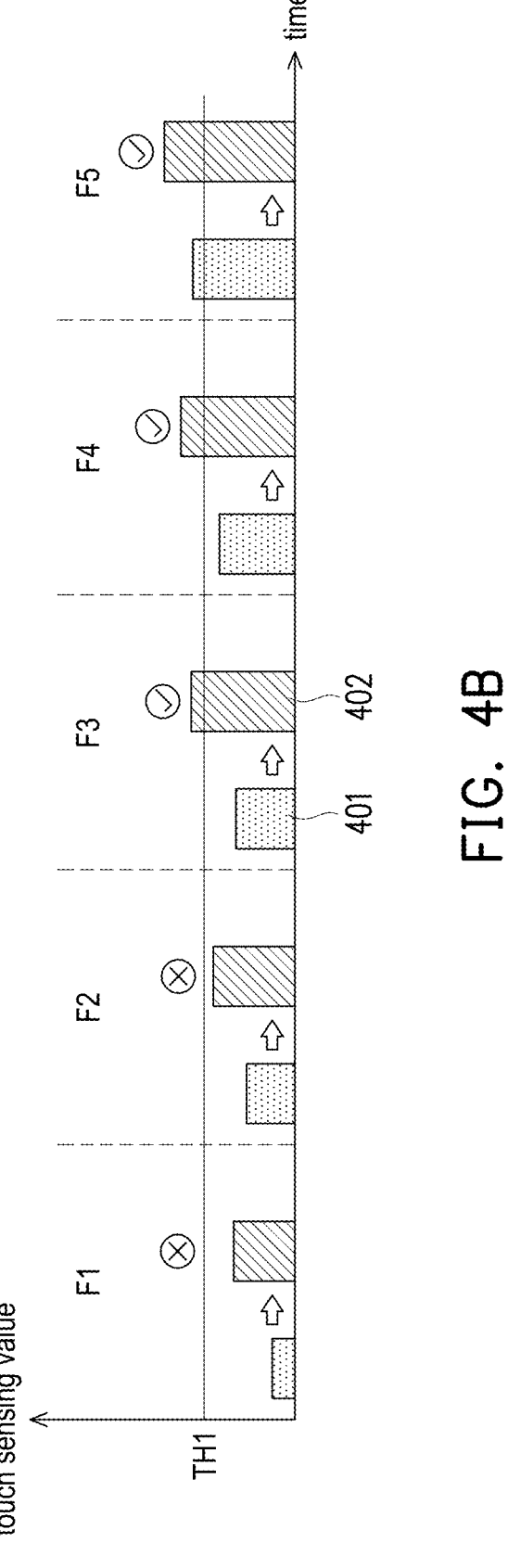
FIG. 4B shows a touch point reporting process according to an embodiment of the invention.

FIG. 4A shows a finger approaching the edge of the sensor according to an embodiment of the invention. FIG. 4B shows a touch point reporting process according to an embodiment of the invention. Referring to FIG. 4A and FIG. 4B, the finger 400 approaches the edge of the sensor 112_1. When the finger 400 is close to the touch panel 110 and positioned at the edge, the sensing value is smaller than the center due to the offset of the hovering position. The normalization algorithm restores the sensing value relative to the center signal value, thereby achieving earlier reporting than the non-normalization algorithm.

For example, in the frame F3 of FIG. 4B, the driver circuit 120 restores the original sensing value 401 to the normalized sensing value 402 according to the signal table 200, and the normalized sensing value 402 is larger than a reporting threshold TH1. Therefore, the driver circuit 120 can report the touch point in the frame F3. If the driver circuit 120 does not restore the original sensing value 401 to the normalized sensing value 402, the driver circuit 120 will report the touch point in the frame F5.

FIG. 5 is a flowchart illustrating a touch control method with normalization calculation according to an embodiment of the invention. Referring to FIG. 1 to FIG. 5, the touch control method with normalization calculation is at least adapted to the touch apparatus 100 of FIG. 1, but the invention is not limited thereto.

Taking the touch apparatus 100 of FIG. 1 for example, in step S100, when the finger 400 hovers on or approaches the touch panel 110, the driver circuit 120 drives the touch panel 110 to detect the touch event, and obtains original sensing values of each frame.

In step S100, the driver circuit 120 obtains a touch position (7, 11) inside a single touched sensor 112_1 according to the first sensing value and the plurality of sensing values of the sensors neighbored with the touched sensor, wherein the first sensing value is the maximum sensing value, and the second largest sensing value is selected from the plurality of sensing values of sensors neighbored with the touched sensor 112_1. In the present embodiment, the touch position obtained in step S100 is (X2, Y2)=(7, 11), which is a position at the edge of the sensor 112_1. In another embodiment, if the plurality of sensing values of sensors neighbored with the touched sensor 112_1 are substantially the same, it indicates that the touch position is at the center of the sensor 112_1.

In step S110, the driver circuit 120 calculates a decreasing ratio according to the touch position (X2, Y2) and the signal table 200. Next, in step S120, the driver circuit 120 restores the original sensing values to normalized sensing values according to the decreasing ratio.

In step S130, the driver circuit 120 performs the touch reporting process according to the normalized sensing values of each frame. As a result, the touch apparatus 100 can detect the touch event, and enter the touch point reporting process early when a human finger or a touch object hovers on or approaches the touch panel 110.

Figures 6A, 6B, 6C:
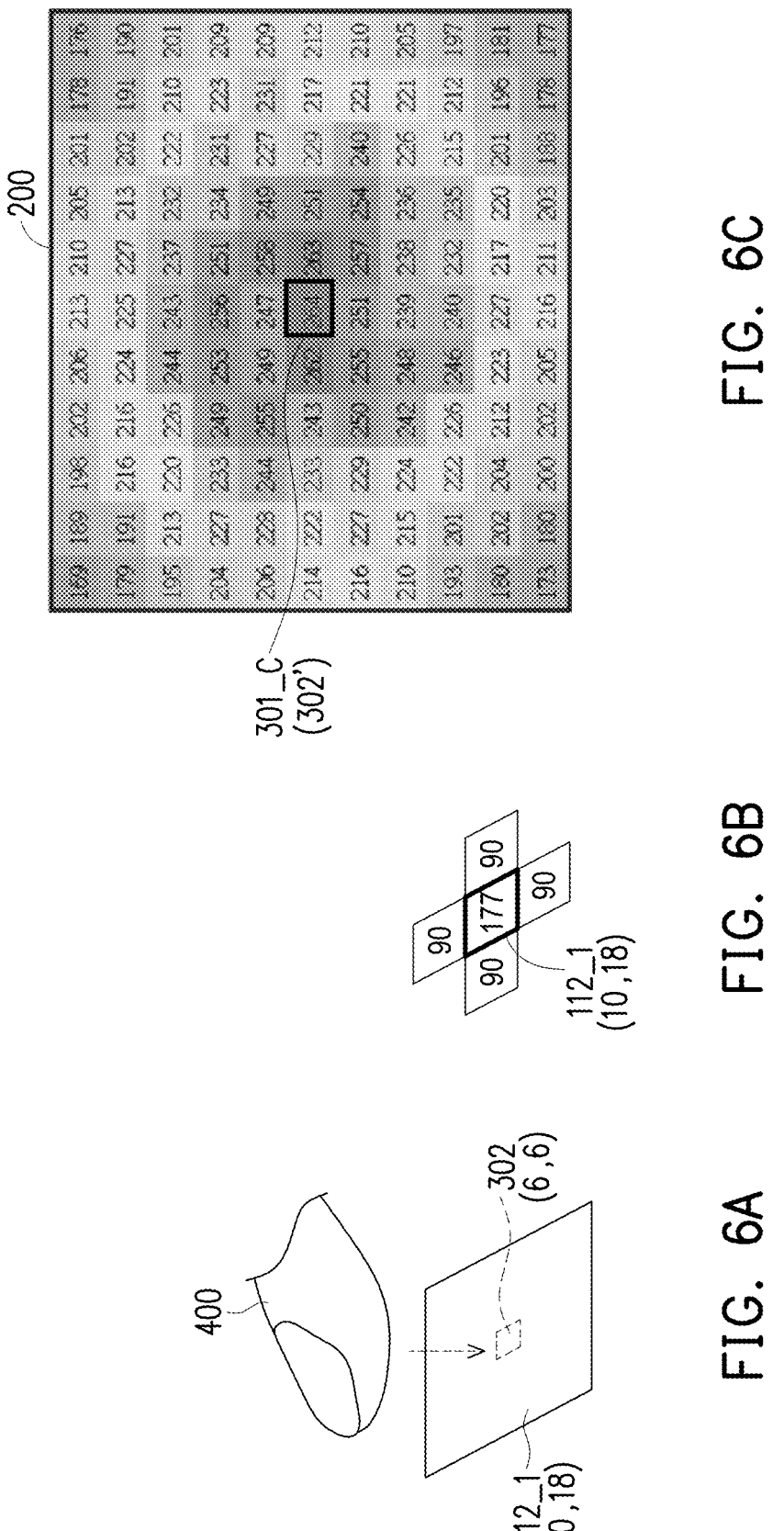
FIG. 6A is a schematic diagram illustrating a finger hovering on the center of the sensor according to an embodiment of the invention.
FIG. 6B illustrates sensing values that the finger hovers on the center of the sensor according to an embodiment of the invention.
FIG. 6C illustrates a corresponding signal value recorded in the signal table according to another embodiment of the invention.

FIG. 6A is a schematic diagram illustrating a finger hovering on the center of the sensor according to an embodiment of the invention. FIG. 6B illustrates sensing values that the finger hovers on the center of the sensor according to an embodiment of the invention. FIG. 6C illustrates a corresponding signal value recorded in the signal table according to another embodiment of the invention.

In FIG. 6A, the finger 400 hovers on a block 302 at the center of the sensor 112_1. The block 302 locates in a touch position (6, 6) of the sensor 112_1, wherein the X-coordinate value X3 and the Y-coordinate value Y3 are both 6. The touch sensing values of the sensor 112_1 and neighboring sensors before normalization are shown in FIG. 6B. The plurality of sensing values of sensors neighbored with the touched sensor 112_1 are substantially the same. It indicates that the touch position is at the center of the sensor 112_1.

When the finger 400 is hovering on the center of the sensor 112_1, the maximum sensing value is sensed to be 177. From the touch position (6, 6), the block 302 corresponds to the center block 302' of the signal table 200, and the signal value recorded in the center block 302' is 264. Therefore, the decreasing ratio is 264/264=1. The driver circuit 120 can calculate a normalized sensing value as 177/1=177 for the touch point reporting process. The original sensing value 177 is normalized to the same value. The above-mentioned values are not intended to limit the invention.

Figure 7A:
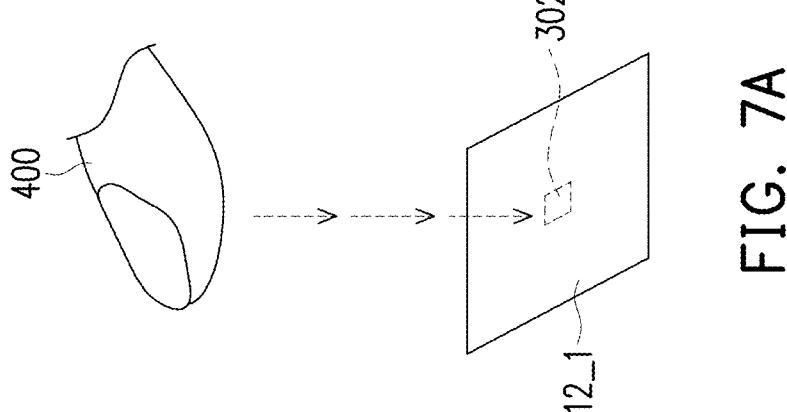
FIG. 7A shows a finger approaching the center of the sensor according to an embodiment of the invention.
Figure 7B:
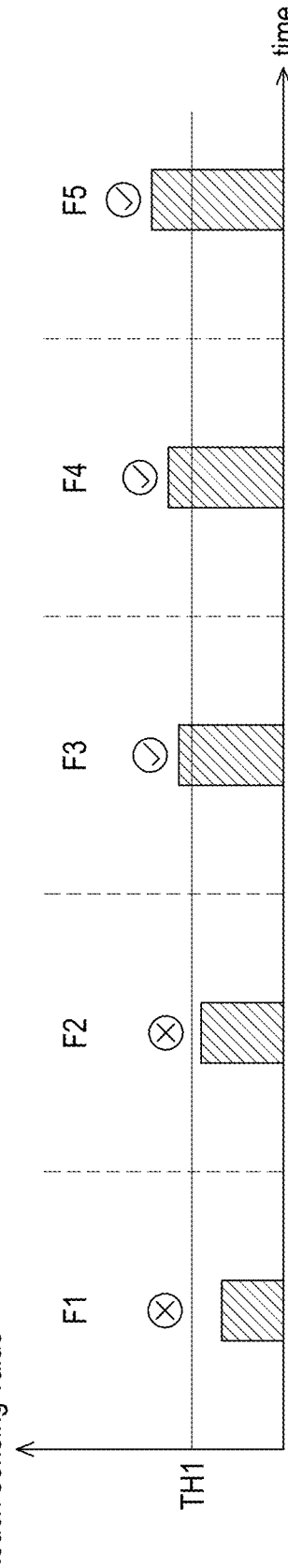
FIG. 7B shows a touch point reporting process according to another embodiment of the invention.

FIG. 7A shows a finger approaching the center of the sensor according to an embodiment of the invention. FIG. 7B shows a touch point reporting process according to another embodiment of the invention. Referring to FIG. 7A and FIG. 7B, the finger 400 approaches the center of the sensor 112_1. In this case, since the decreasing ratio is 1, the original sensing value in the frames F1 to F5 is normalized to the same value. The driver circuit 120 also reports the touch point in the frame F3.

Figure 8A:
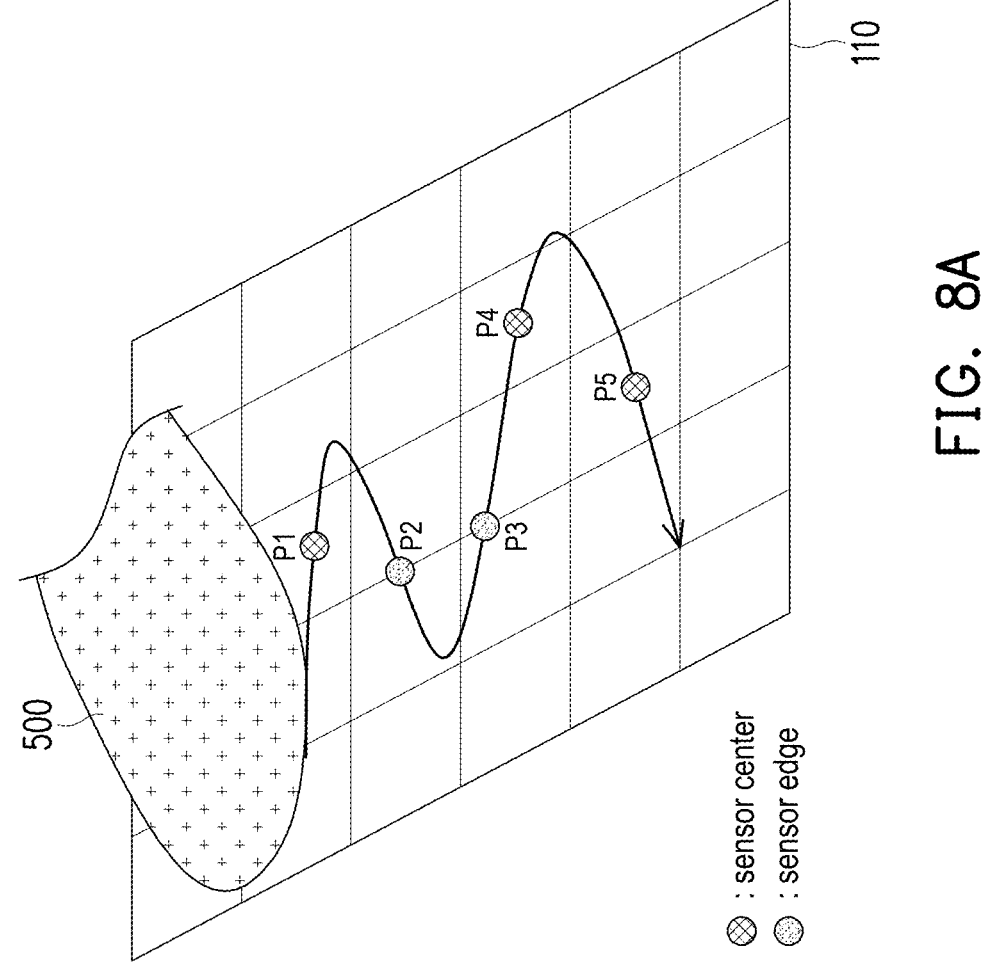
FIG. 8A shows a finger sliding on the touch panel according to an embodiment of the invention.
Figure 8B:
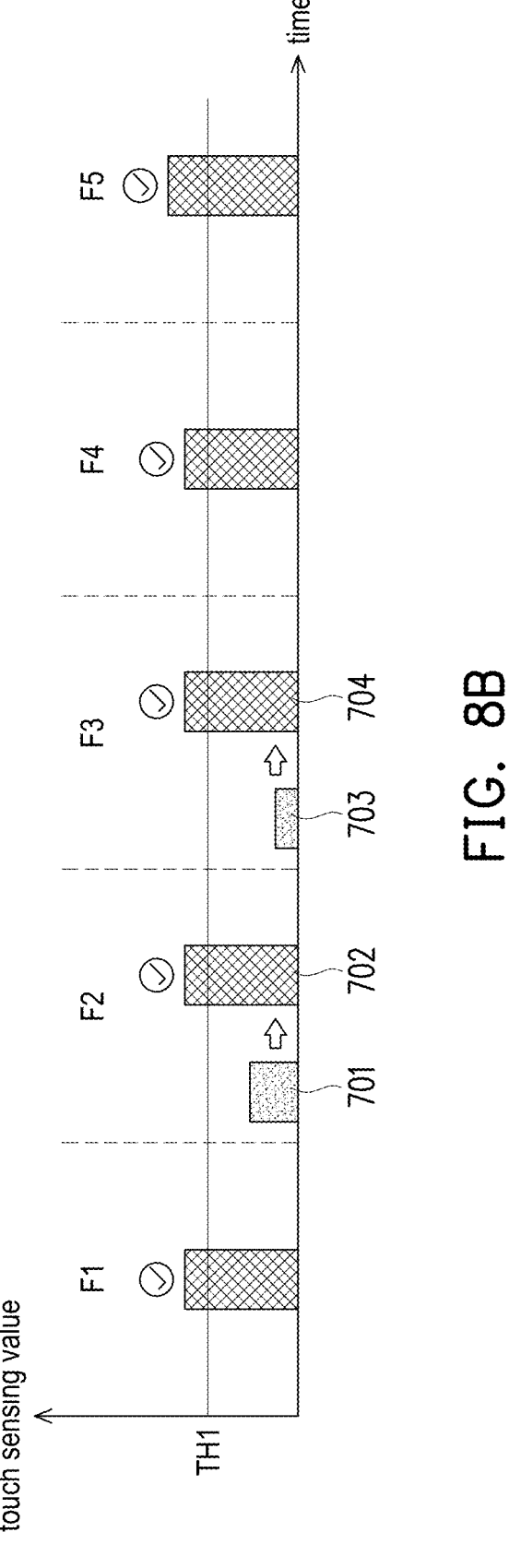
FIG. 8B shows a touch point reporting process according to another embodiment of the invention.

FIG. 8A shows a finger sliding on the touch panel according to an embodiment of the invention. FIG. 8B shows a touch point reporting process according to another embodiment of the invention. Referring to FIG. 8A and FIG. 8B, the finger 500 slides on the touch panel 110. In FIG. 8A, the touch points P1, P4 and P5 locate in the centers of the sensors, and will be respectively reported in the frames F1, F4 and F5. On the other hand, the touch points P2 and P3 locate on the edges of the sensors, and will be respectively reported in the frames F2 and F3.

In the present embodiment, when wearing gloves and sliding the finger 500 on the touch panel 110, the sliding process may sometimes fall in the center of the sensor and sometimes fall on the edge of the sensor, and the sensing values may be too small in some frames. If the sensing value is too small, it may be lower than the reporting threshold TH1, and cannot be reported.

In this case, in the frames F2 and F3, the driver circuit 120 respectively restores the original sensing values 701 and 703 to the normalized sensing values 702 and 704 according to the signal table 200, and the normalized sensing values 702 and 704 are larger than the reporting threshold TH1. Therefore, the driver circuit 120 can correctly report the touch points P1 to P5 during the sliding process.

Figure 9:
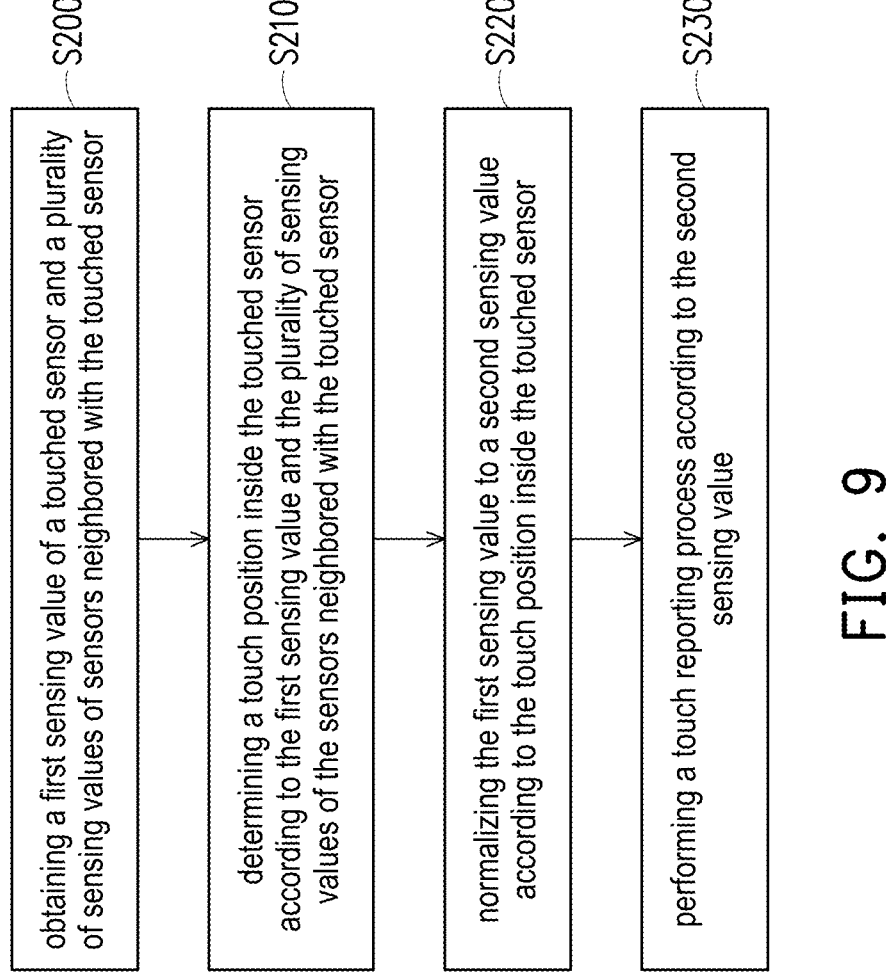
FIG. 9 is a flowchart illustrating a touch control method with normalization calculation according to another embodiment of the invention.

FIG. 9 is a flowchart illustrating a touch control method with normalization calculation according to another embodiment of the invention. Referring to FIG. 1 and FIG. 9, the touch control method with normalization calculation is at least adapted to the touch apparatus 100 of FIG. 1, but the invention is not limited thereto.

Taking the touch apparatus 100 of FIG. 1 for example, in step S200, the driver circuit 120 obtains a first sensing value of a touched sensor and a plurality of sensing values of sensors neighbored with the touched sensor. In step S210, the driver circuit 120 determines a touch position inside the touched sensor according to the first sensing value and the plurality of sensing values of the sensors neighbored with the touched sensor. In step S220, the driver circuit 120 normalizes the first sensing value to a second sensing value according to the touch position inside the touched sensor. In step S230, the driver circuit 120 performs a touch reporting process according to the second sensing value.

The touch control method with normalization calculation described in the embodiment of the invention is sufficiently taught, suggested, and embodied in the embodiments illustrated in FIG. 1 to FIG. 8B, and therefore no further description is provided herein.

In summary, in the embodiments of the invention, at least one signal table is established for sensors in advance, and the sensing values are restored to normalized sensing values according to the signal table. The normalized sensing values are used to determine touch points in the touch reporting process. As a result, the proposed touch control method is capable of enhancing the sensitivity and accuracy of the touch panel and improving the user experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch control method, configured to control a touch sensing operation of a touch apparatus having a plurality of sensors, the touch control method comprising:

obtaining a first sensing value of a touched sensor and a plurality of sensing values of sensors neighbored with the touched sensor;

determining a touch position inside the touched sensor according to the first sensing value and the plurality of sensing values of the sensors neighbored with the touched sensor;

normalizing the first sensing value to a second sensing value according to the touch position inside the touched sensor, wherein the second sensing value is larger than the first sensing value; and performing a touch reporting process according to the second sensing value.

2. The touch control method according to claim 1, wherein the step of performing the touch reporting process according to the second sensing value comprises:

when the second sensing value is larger than a reporting threshold, reporting a touch point of a touch object in the touch reporting process.

3. The touch control method according to claim 1, wherein the step of normalizing the first sensing value to the second sensing value according to the touch position inside the touched sensor comprises:

normalizing the first sensing value to the second sensing value further according to at least one signal table.

4. The touch control method according to claim 3, wherein the at least one signal table records a plurality of signal values of the touched sensor.

5. The touch control method according to claim 4, wherein the signal values comprise a first signal value and a second signal value, and the second signal value corresponds to a center position of the touched sensor.

6. The touch control method according to claim 5, wherein the first signal value is smaller than the second signal value.

7. The touch control method according to claim 4, wherein the signal values are obtained by a test device.

8. The touch control method according to claim 1, further comprising:

calculating a decreasing ratio according to the touch position inside the touched sensor and at least one signal table.

9. The touch control method according to claim 8, the step of normalizing the first sensing value to the second sensing value according to the touch position inside the touched sensor comprises:

normalizing the first sensing value to the second sensing value further according to the decreasing ratio.

\* \* \* \* \*